United States Patent
Ashton et al.

(10) Patent No.: US 7,625,510 B2
(45) Date of Patent: Dec. 1, 2009

(54) SYSTEM, METHOD, AND APPARATUS FOR PRODUCTION-WORTHY, LOW COST COMPOSITE TOOL FABRICATION

(75) Inventors: Todd H. Ashton, Fort Worth, TX (US); Richard R. Batzer, Mansfield, TX (US); Ronald P. Schmidt, Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 652 days.

(21) Appl. No.: 11/289,263

(22) Filed: Nov. 29, 2005

(65) Prior Publication Data

US 2007/0120288 A1    May 31, 2007

(51) Int. Cl.
    B29C 70/44    (2006.01)
(52) U.S. Cl. ..................................... 264/258
(58) Field of Classification Search .................. 264/258
    See application file for complete search history.

(56) References Cited

U.S. PATENT DOCUMENTS

| | | | | |
|---|---|---|---|---|
| 4,942,013 A | * | 7/1990 | Palmer et al. | 264/511 |
| 5,196,059 A | * | 3/1993 | Niebylski | 106/287.11 |
| 5,837,372 A | * | 11/1998 | Wilkinson et al. | 428/400 |
| 6,374,570 B1 | | 4/2002 | McKague, Jr. | 52/762 |
| 6,520,706 B1 | | 2/2003 | McKague, Jr. et al. | 403/265 |
| 6,589,472 B1 | | 7/2003 | Benson et al. | 264/510 |

OTHER PUBLICATIONS

Rosato, Dominick V.; Schott, Nick R.; Rosato, Donald V.; Rosato, Marlene G. Plastics Institute of America Plastics Engineering Manufacturing and Data Handbook. Springer—Verlag. p. 1134-1135 Online version available at: http://knovel.com/web/portal/browse/display?_EXT_KNOVEL_DISPLAY_bookid=1118&VerticalID=0.*

* cited by examiner

*Primary Examiner*—Christina Johnson
*Assistant Examiner*—Galen Hauth
(74) *Attorney, Agent, or Firm*—Bracewell & Giuliani LLP (57) ABSTRACT

Composite tooling is fabricated with low cost dry fabrics and a neat resin instead of expensive prepregs. Dry, three-dimensional woven joint preforms are placed on a dry tool substrate and dry, 3D preforms are also placed between pre-cured egg crate-like junctions. The entire tool substrate and substrate-to-support structure joints are then resin-infused simultaneously through the use of rota-molded tooling aids, providing an additional reduction in cost. Tight control of resin content and distribution with vacuum infusion is thereby provided. This process eliminates the primary cause of structural weakness and cooling distortion, which typically occur at the attachment interface when existing methods are used. The preforms provide significantly greater pull-off strengths at interfaces than do hand-laid tie plies. Issues with tool surface durability are addressed through the use of ceramic-filled face coat.

13 Claims, 5 Drawing Sheets

SYSTEM, METHOD, AND APPARATUS FOR PRODUCTION-WORTHY, LOW COST COMPOSITE TOOL FABRICATION

BACKGROUND OF THE INVENTION

1. Technical Field

The present invention relates in general to composite tooling and, in particular, to an improved system, method, and apparatus for improved, low cost composite tool fabrication of composite parts.

2. Description of the Related Art

Composite carbon fiber tooling for fabrication and cure of composite parts has traditionally offered several advantages, including significantly lower weight, which facilitates ease of handling. If designed and fabricated properly, composite tooling can also provide precise match-up of a tool's coefficient of thermal expansion (CTE) to that of the part. In addition, composite tooling has a low thermal mass, such that heat up and cool down becomes much more efficient than that of metallic (e.g., INVAR) tooling. Moreover, composite tooling provides close replication of original master model dimensions and contours, and reduced acquisition lead time as compared to metallic tooling.

However, typical composite tooling also has deficiencies which, in many cases, preclude its use for production. These deficiencies include high material and labor costs, such as those for prepregs, protracted lay-up time, long autoclave compaction and cure cycles. Composite tooling also exhibits poor surface durability and/or vacuum integrity since polymeric surfaces do not last long in a production environment. In addition, composite tooling typically uses archaic and expensive methods to attach an "egg crate" type structural support to the tool substrates. It also has inherent weakness in the substrate-to-egg crate attachment schemes (e.g., the tool dimensional stability erodes over time). Moreover, an intermediate tool fabrication step is usually required since machined master models cannot hold tolerances when subjected to elevated cure temperatures. This adds significant cost to the final product, and increases the risk of dimensional tolerance build-up. Furthermore, there is degradation of tool laminates due to thermal cycling since epoxy tools cannot handle much more than 100 cycles.

Of the various problems previously stated, only the last one has been addressed by the composite tooling industry, primarily through the use of bismaleimide (BMI) prepregs. As such, only the life cycle cost of composite tools has been reduced. The move by some in the industry toward prepreg BMI tools has done nothing to address the exorbitant acquisition costs of prepreg tooling, or their susceptibility to both surface and substructure damage. The acquisition costs are so high and the long term durability of typical composite tools is so low, that it can be more cost effective to use metallic (e.g., INVAR) tooling. This can be true even when factoring the higher cost of handling heavy INVAR tools, their inefficient heat up and cool down rates, and their dimensional inaccuracies and/or instability. Thus, an improved solution for fabricating composite tooling would be desirable.

SUMMARY OF THE INVENTION

One embodiment of a system, method, and apparatus for fabricating composite tooling resolves the above-mentioned deficiencies using various embodiments and materials. For example, low cost dry fabrics and a neat BMI resin may be used instead of expensive prepregs. Labor is also notably reduced since dry fabrics conform much more readily to contours than do prepregs. In addition, autoclave time is eliminated since the process simply utilizes vacuum-assisted resin infusion and an oven. Tooling constructed in accordance with the present invention also may utilize a high temperature surface coating that is filled with ceramic particulate (80% loading). This provides a tool surface with greatly enhanced abrasion and damage resistance, and vacuum integrity is assured since there are no fiber-induced leak paths at or near the tool surface.

In one embodiment, the present invention places dry, three-dimensional (3D) woven pi-shaped preforms on the dry tool substrate, followed by installation of pre-cured, pre-cut "egg-crate" planks, which are then tied together with additional dry, pi-shaped preforms. Finally, the entire assembly is infused and cured together to form a high strength, unitized tool. Imprecise and expensive hand wet-out and lay-up of tie plies for attachment of egg crate planks to the substrate is eliminated. The present invention also provides tight control of resin content and distribution with vacuum infusion. This process eliminates the primary cause of structural weakness and tool distortion, which typically occurs at the attachment interface when traditional methods are used. The pi-shaped preforms additionally provide much greater pull off strengths at that interface than do hand-laid tie plies.

Machinable plaster/polymeric modeling material is cast, heat-treated, machined and sealed to be used as a low CTE, dimensionally stable master. The ceramic-filled face coat is applied, followed by lay-up of the dry plies and pi preforms. The entire assembly is bagged and vacuum infused with BMI resin and oven-cured. The master does not have to withstand an autoclave environment, and the need for a costly intermediate tool is thereby eliminated. In addition, the BMI resin and adhesive is used throughout the process will potentially allow the tool to withstand thousands of high temperature (e.g., 350° F.) production cure cycles.

From a structural and durability standpoint, the solution presented herein makes notable improvements in the two weakest aspects of composite tooling, namely, the substrate-to-egg crate interface, and the durability of the tool surface. These two improvements increase the service life of BMI tools, thereby reducing production life cycle costs even further. In terms of acquisition cost, this solution allows BMI tooling to compete cost wise with metallic tooling. BMI tools built with these concepts offer all the inherent advantages of composite tooling, while eliminating the traditional disadvantages of high cost and poor durability.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the invention, as well as others which will become apparent are attained and can be understood in more detail, more particular description of the invention briefly summarized above may be had by reference to the embodiment thereof which is illustrated in the appended drawings, which drawings form a part of this specification. It is to be noted, however, that the drawings illustrate only an embodiment of the invention and therefore are not to be considered limiting of its scope as the invention may admit to other equally effective embodiments.

DETAILED DESCRIPTION OF THE INVENTION

Referring to FIGS. 1-6, various embodiments of forming composite tooling are disclosed. In one embodiment, the method includes providing a model 11 (FIG. 1) of a production part. A ceramic-filled face coating 13 is applied to the contact surface of the model 11 in a liquid form. When cured, the coating 13 has a hardness that exceeds that of a substrate 15 that ultimately forms the composite tool. In one embodiment, the substrate 15 is formed by laying up dry materials, such as woven graphite, on the coating 13. These materials are substantially dry and are not pre-impregnated with resin or the like.

In a subsequent step, dry supporting elements 21 are laid up on the substrate 15 to form a support structure 23 (see FIG. 4) for the substrate 15. Like the dry materials of substrate 15, the dry supporting elements 21 are substantially dry and are not pre-impregnated. These designs are more fully disclosed in U.S. Pat. Nos. 6,374,570 and 6,520,706, which are incorporated herein by reference in their entirety.

For example, support structure 23 may comprise pre-cured composite boards 25 and dry fabric pi-shaped preforms 21 of three-dimensionally woven graphite. In one embodiment, the pi-shaped preforms 21 have a base 27 and a pair of walls 29 protruding from the base 27 with a clevis 31 formed between the pair of walls 29. The composite boards 25 are positioned in the devises 31 of the pi-shaped preforms 21, and the boards 25 and preforms 21 are formed at right angles (FIG. 4) with respect to other ones of the boards 25 and preforms 21 to form an eggcrate-like structural support system 23 for the substrate 15.

In one embodiment, the dry materials of substrate 15 and dry support structure 23 (e.g., dry supporting elements 21) may be lightly sprayed with a tackifier mixture of BMI resin and acetone to conform portions of the dry materials 15 and dry preforms 21 to a desired shape. Other types of material also may be used, such as phenolic resins, cyanate esters, and other materials known to those skilled in the art for working at service temperatures that exceed the capabilities of epoxies. This step is helpful in conforming the dry components to curvatures and other geometric designs prior to infusion and cure. In one embodiment, rotationally-molded, cross-link polyethylene 33 is applied to the substrate 15 and support structure 23 to maintain structural integrity of the system prior to and during infiltration, as well as during cure. This design is more fully disclosed in U.S. Pat. No. 6,589,472, which is incorporated herein by reference in its entirety.

Figure 1:
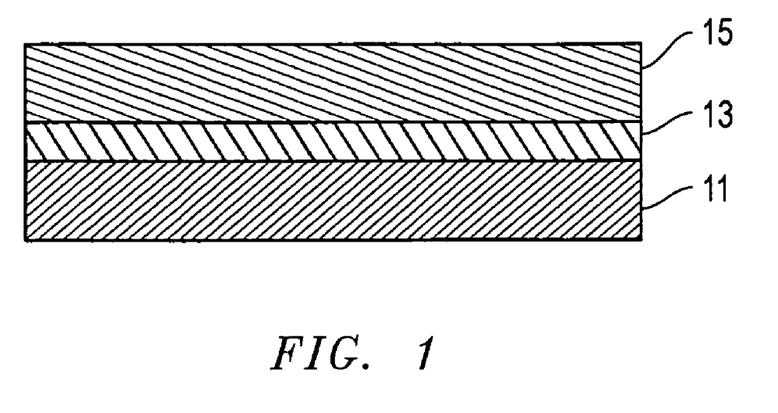
FIG. 1 is a sectional end view of one embodiment of a composite tool constructed in accordance with the present invention.
Figure 2:
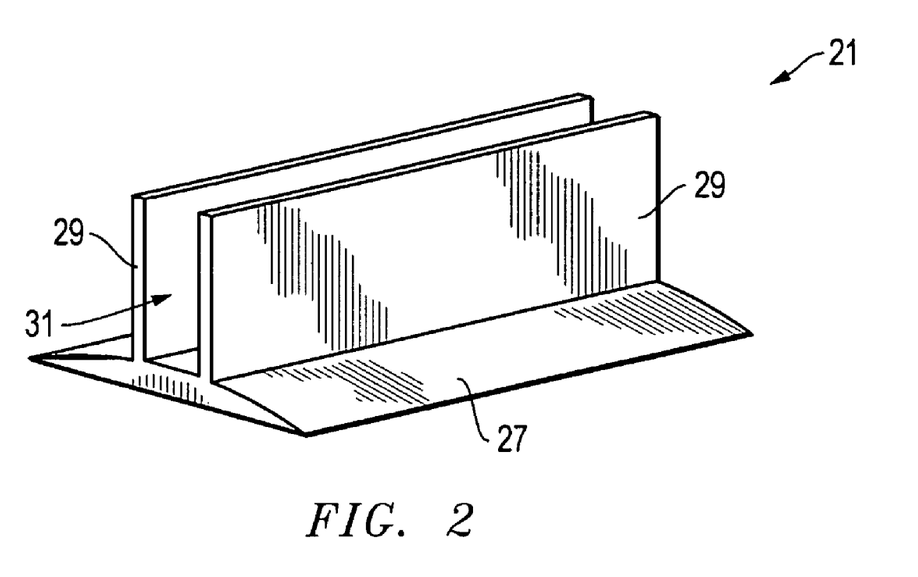
FIG. 2 is an isometric view of one embodiment of a pi-preform utilized by the present invention.
Figure 3:
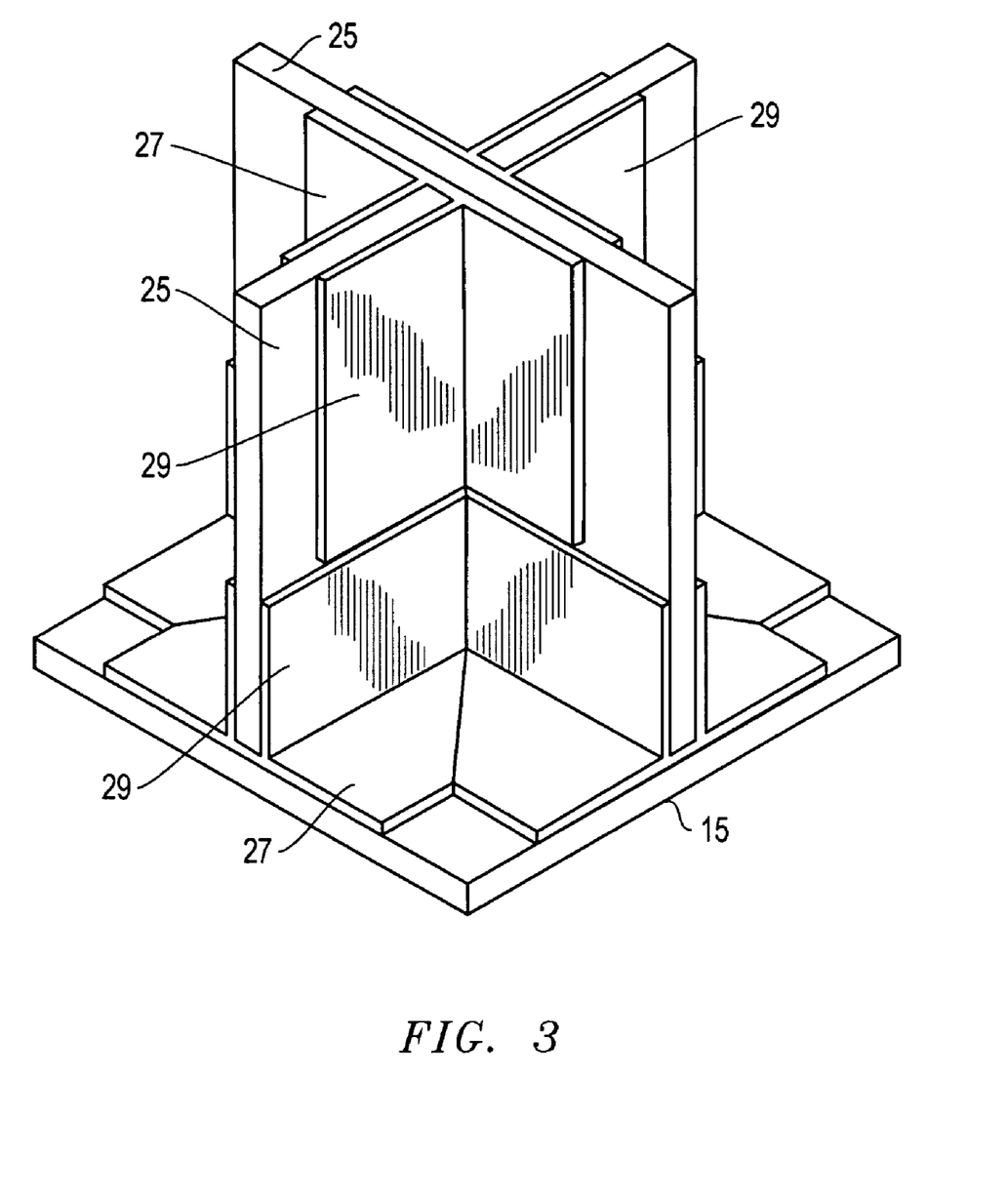
FIG. 3 is an isometric view of a subassembly comprising the pi-preform of FIG. 2 and intersecting pre-cured composite boards.
Figure 4:
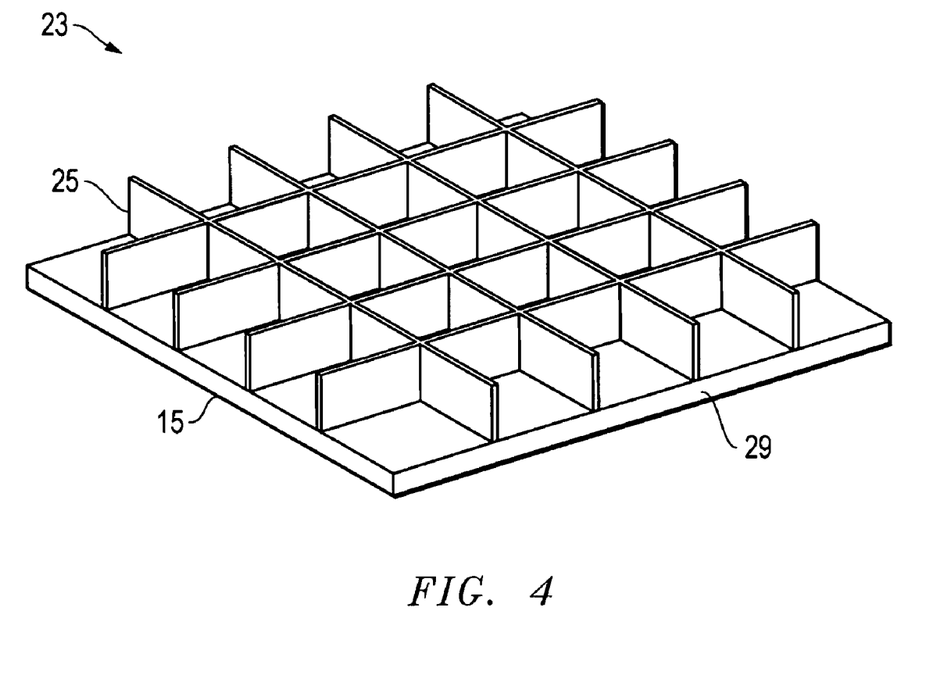
FIG. 4 is an isometric view of one embodiment of a composite tool assembly constructed with intersecting subassemblies as shown in FIG. 3.
Figure 5:
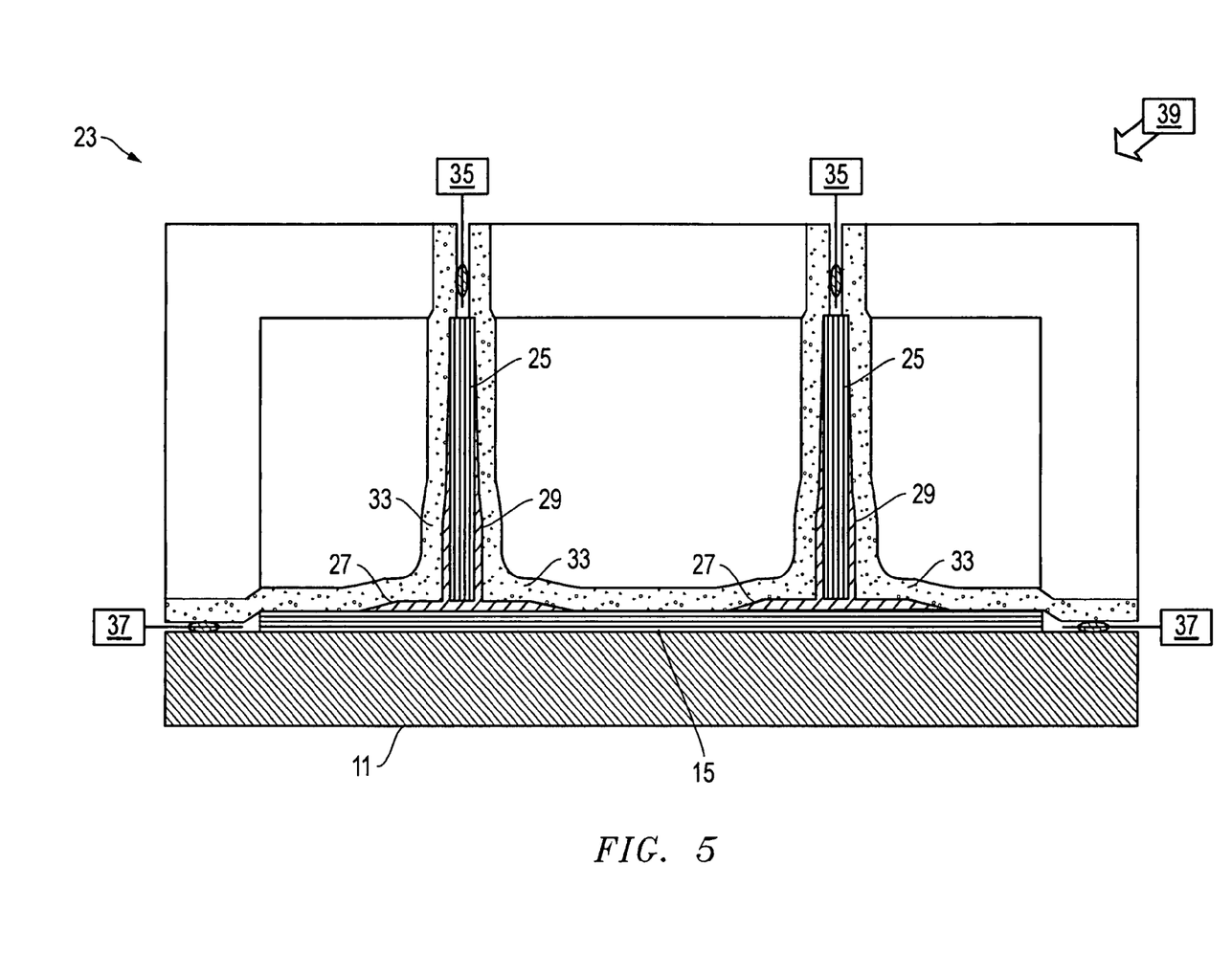
FIG. 5 is a sectional end view of the tool of FIG. 4 during a resin infiltration step in accordance with the present invention.

As depicted in FIG. 5, the substrate 15 and the support structure 23 are placed in an evacuated environment, such as the sealed vacuum bag environment illustrated. This environment is then evacuated 35. A resin 37, such as BMI resin, is injected into the evacuated environment such that the resin infiltrates the substrate 15 and the pi-preforms 21 of support structure 23. The vacuum 35 and resin 37 may be positioned as shown in FIG. 5, vice versa, or in still other configurations. Unlike prior art designs, the composite tool of the present invention is formed by simultaneously infiltrating and curing both the substrate 15 and support structure 23 in an oven 39 without the use of an autoclave. The use of dry components, rather than pre-impregnated materials, eliminates the need for an autoclave. In one embodiment, the uncured, infiltrated tool is heated at approximately 200° F. by oven 39, although this operation may be performed at room temperatures with phenolic resins, cyanate esters, etc.

After initial cure, the composite tool is removed from the evacuated environment and the model 11. The cross-linked polyethylene 33 is also removed from the composite tool. The composite tool is then subjected to a free-standing oven post-cure in order to attain the desired glass transition temperature of the structure.

BMI has an ultra low viscosity (at the approximately 200° F. infiltration temperature) that is ideally suited for infiltration. On the other hand, the higher viscosity of high performance epoxies renders them unsuitable for infiltration, thus they can only be used in the expensive prepreg form. In terms of durability at high temperatures, high performance epoxies cannot compete with BMI. For example, the glass transition temperature (Tg) of the highest performance epoxy will rarely surpass 390° F., whereas BMI's Tg can be pushed as high as 550° F. When both attributes are taken into account for this application, the superior performance of BMI resin is readily apparent.

Figure 6:
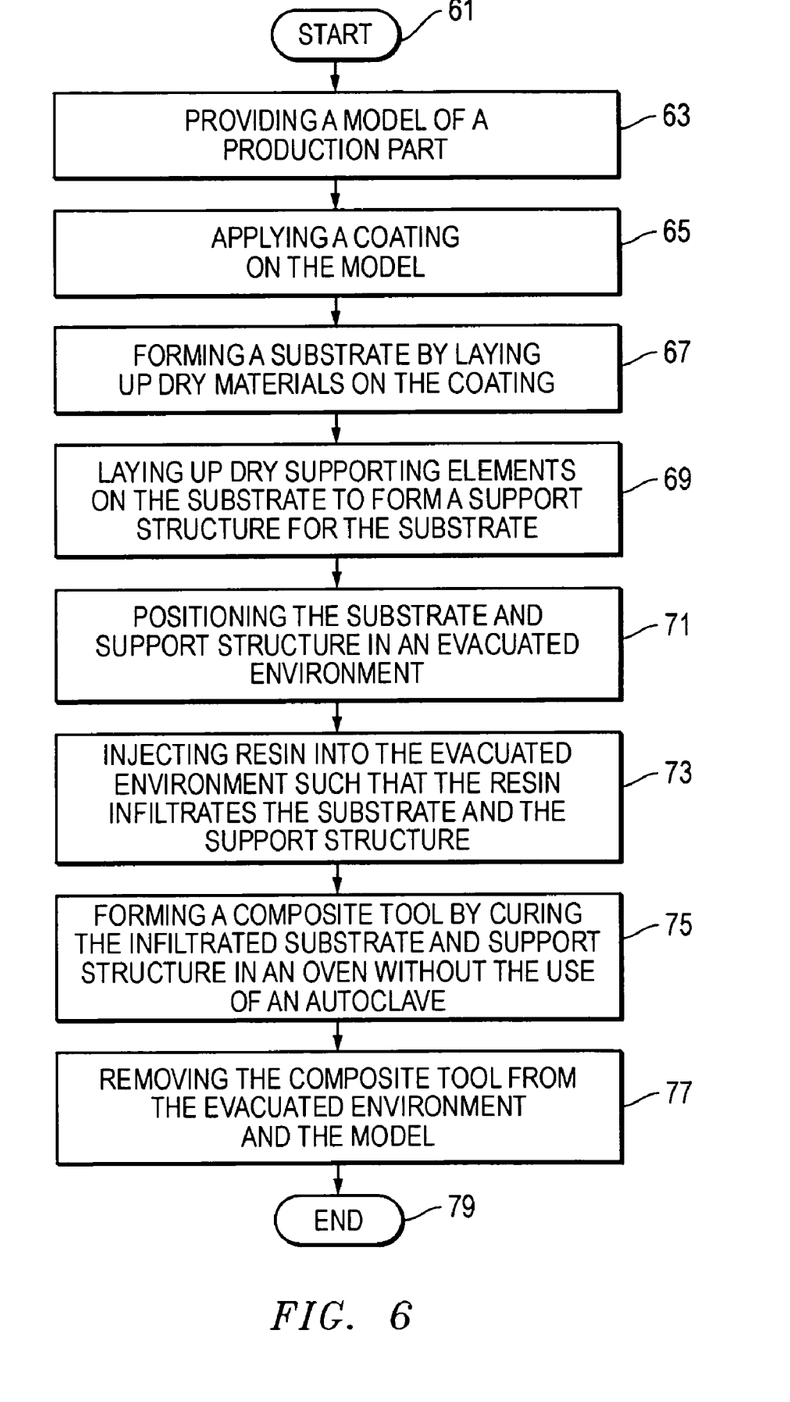
FIG. 6 is a high level flow diagram of one embodiment of a method constructed in accordance with the present invention.

Referring now to FIG. 6, one embodiment of a method of forming composite tooling is disclosed. The method begins as indicated at step 61, and comprises providing a model of a production part (step 63); applying a coating on the model (step 65); forming a substrate by laying up dry materials on the coating (step 67); laying up dry supporting elements on the substrate to form a support structure for the substrate (step 69); positioning the substrate and the support structure in an evacuated environment (step 71); injecting resin into the evacuated environment such that the resin infiltrates the substrate and the support structure (step 73); forming a composite tool by curing the infiltrated substrate and support structure in an oven without the use of an autoclave (step 75); and removing the composite tool from the evacuated environment and the model (step 77); before ending as indicated at step 79.

The method also may comprise applying a liquid, ceramic-filled face coating on the model that, when cured, has a hardness in excess of the substrate, and laying up dry, three-dimensional, woven graphite at a depth of approximately 0.25 inches on the coating while the coating is still tacky. The method may further comprise spotting the dry materials and dry support structure with a tackifier mixture of BMI and acetone to conform portions of the dry materials and dry support structure to a desired shape.

In one embodiment, the method comprises laying up pre-cured composite boards and dry fabric pi-shaped preforms of three-dimensionally woven graphite, the pi-shaped preforms having a base and a pair of walls protruding from the base with a clevis formed between the pair of walls, and positioning the composite boards in the devises of the pi-shaped preforms. The method may further comprise forming the boards and preforms at right angles with respect to other ones of the boards and preforms to form an eggcrate-like structural support system for the substrate. Still other embodiments further comprise applying rotationally-molded, cross-link polyethylene (XLPE) tooling aids to the substrate and support structure for subsequent infiltration, and later removing the XLPE tooling aids after the composite tool is cured.

While the invention has been shown or described in only some of its forms, it should be apparent to those skilled in the art that it is not so limited, but is susceptible to various changes without departing from the scope of the invention.

What is claimed is:

1. A method of forming a composite production part, the method comprising:
   (a) providing a mold of a production part;
   (b) applying a liquid, ceramic-filled face coating on the mold;
   (c) forming a substrate by laying up dry composite fiber materials on the liquid, ceramic-filled face coating while the coating is still tacky, the coating having a hardness in excess of a hardness of the substrate when the coating is cured;
   (d) providing dry woven fiber composite preforms, each having two parallel walls extending from a base, inserting pre-cured composite boards between the parallel walls and placing bases of the preforms on the substrate so that edges of at least some of the boards abut non-edge portions of other boards to form a support structure for the substrate;
   (e) positioning the substrate and the support structure in an evacuated environment;
   (f) injecting resin into the evacuated environment such that the resin infiltrates the substrate and the preforms of the support structure;
   (g) forming a composite tool by curing the infiltrated substrate and the preforms in an oven without the use of an autoclave;
   (h) removing the composite tool from the evacuated environment and the mold; then
   (i) laying up composite materials for the production part on a side of the composite tool that was previously in contact with the ceramic-filled face coating.

2. A method according to claim 1, wherein step (c) comprises laying up dry woven graphite at a depth of approximately 0.25 inches on the coating.

3. A method according to claim 1, wherein steps (d) further comprises spotting the preforms with a tackifier comprising bismaleimide (BMI) or a phenolic resin.

4. A method according to claim 1, wherein the boards in step (d) have outer portions that protrude past the parallel walls of the performs and where step (d) further comprises bonding the outer portions of the abutting boards to each other with additional preforms, each of the additional preforms having a base that is placed against the non-edge portion of one of the boards and two parallel walls defining a slot for receiving the edge of another of the boards.

5. A method according to claim 1, wherein step (d) further comprises applying cross-linked polyethylene (XLPE) tooling aids to the substrate and between adjacent ones of the boards prior to step (e), and step (h) further comprises removing the XLPE tooling aids from the composite tool.

6. A method according to claim 1, wherein step (f) comprises injecting bismaleimide (BMI) at an elevated temperature.

7. A method according to claim 1, wherein step (g) comprises heating the infiltrated substrate and support structure to approximately 375° F. to achieve initial cure of the overall structure.

8. A method of forming a composite production part, the method comprising:
   (a) providing a mold of a production part;
   (b) applying a ceramic-filled face coating on the mold in a liquid form;
   (c) forming a substrate by laying up dry, three-dimensional woven graphite materials on the liquid, ceramic-filled face coating while the ceramic-filled face coating is still tacky, the coating having a hardness in excess of a hardness of the substrate when the coating is cured;
   (d) providing dry woven fiber composite preforms, each having two parallel walls extending from a base, inserting pre-cured composite boards between the parallel walls and placing the bases of the preforms on the substrate so that edges of some of the boards abut non-edge portions of other boards to form a support structure for the substrate;
   (e) placing tooling aids between adjacent ones of the boards, then positioning the substrate and the support structure in an evacuated environment by vacuum bagging the substrate and the support structure;
   (f) injecting bismaleimide (BMI) resin into the evacuated environment such that the resin simultaneously infiltrates the substrate and the preforms of the support structure; then
   (g) forming a composite tool by curing the infiltrated substrate and the preforms in an oven without the use of an autoclave; then
   (h) removing the composite tool from the evacuated environment and the mold and removing the tooling aids; and then
   (i) laying up composite materials of the production on the side of the composite tool that was previously in contact with the ceramic-filled face coating.

9. A method according to claim 8, wherein steps (c) and (d) further comprise spotting the dry materials and dry preforms with a tackifier mixture of BMI and acetone to conform portions of the dry materials and dry preforms to a desired shape.

10. A method according to claim 1, wherein the boards in step (d) have outer portions that protrude beyond the parallel walls of the performs and wherein step (d) further comprises bonding the outer portions of intersecting ones of the boards to each other with additional preforms, each of the additional preforms having a base placed in contact with one the non-edge portion of one of the boards and two parallel walls defining a slot that receive an edge of another one of the boards.

11. A method according to claim 8, wherein the tooling aids of step (d) are formed of cross-linked polyethylene (XLPE).

12. A method according to claim 8, wherein step (g) comprises heating the infiltrated substrate and support structure at approximately 375° F. to achieve initial cure.

13. A method of forming a composite production part, the method comprising:
   (a) providing a mold of a production part;
   (b) applying a ceramic-filled face coating on the mold in a liquid form that, when cured, has a hardness in excess of a substrate;
   (c) forming the substrate by laying up dry materials on the liquid coating while still tacky, the dry materials comprising woven graphite;
   (d) providing dry woven fiber composite preforms, each having two parallel walls extending from a base, inserting pre-cured composite boards between the parallel walls and placing the bases of the preforms on the substrate so that edges of some of the boards abut non-edge portions of other boards and have outer portions that extend outward past the parallel walls of the performs to form a support structure for the substrate, inserting the outer portions of some of the boards into parallel walls of additional performs and placing the bases of the additional performs against the non-edge portions of other boards, and applying tooling aids between adjacent boards;

(e) spotting the dry materials and preforms with a tackifier mixture to conform portions of the dry materials and preforms to a desired shape;

(f) positioning the substrate and the support structure in an evacuated environment;

(g) injecting heated bismaleimide (BMI) resin into the evacuated environment such that the resin infiltrates the substrate and the preforms; then (h) forming a composite tool by curing the infiltrated substrate and the preforms in an oven without the use of an autoclave; then (i) removing the composite tool from the evacuated environment and the mold, and removing the tooling aids from the composite tool; and then (j) applying composite materials of the production parts on the side of the composite tool that was previously in contact with the ceramic-filled face coating.

* * * * *

UNITED STATES PATENT AND TRADEMARK OFFICE
CERTIFICATE OF CORRECTION

PATENT NO.       : 7,625,510 B2                                                                   Page 1 of 1
APPLICATION NO.  : 11/289263
DATED            : December 1, 2009
INVENTOR(S)      : Ashton et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 898 days.

Signed and Sealed this

Second Day of November, 2010

David J. Kappos
*Director of the United States Patent and Trademark Office*